(12) United States Patent
Suzuki et al.

(10) Patent No.: US 10,837,925 B1
(45) Date of Patent: Nov. 17, 2020

(54) X-RAY DETECTOR MONITORING DEVICE

(71) Applicant: Shimadzu Corporation, Kyoto (JP)

(72) Inventors: Keijiro Suzuki, Kyoto (JP); Takao Marui, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/797,243

(22) Filed: Feb. 21, 2020

(51) Int. Cl.
    *G01N 23/00*    (2006.01)
    *G01N 23/223*  (2006.01)
    *G01K 7/16*     (2006.01)

(52) U.S. Cl.
    CPC .............. *G01N 23/223* (2013.01); *G01K 7/16* (2013.01); *G01N 2223/076* (2013.01); *G01N 2223/3103* (2013.01); *G01N 2223/317* (2013.01)

(58) Field of Classification Search
CPC combination set(s) only.
See application file for complete search history.

(56) References Cited

U.S. PATENT DOCUMENTS

2011/0311023 A1* 12/2011 Sagoh ................ A61B 6/585
    378/19

FOREIGN PATENT DOCUMENTS

| JP | 1993-159733 | 6/1993 |
|----|-------------|--------|
| JP | 1993-283192 | 10/1993 |
| JP | 2006-242663 | 9/2006 |

\* cited by examiner

*Primary Examiner* — Dani Fox
(74) *Attorney, Agent, or Firm* — Muir Patent Law, PLLC

(57) ABSTRACT

An X-ray detector monitoring device capable of detecting a time when an X-ray detector is disabled due to a slow leak is provided. The X-ray detector monitoring device is provided with an X-ray detection element 32 for detecting X-ray intensity, an X-ray detector 30 having a vacuum insulation container 33 in which an X-ray introduction window 31 is formed, a cooling means 60 for cooling the X-ray detection element 32, a detection element temperature sensor 81 mounted on the X-ray detection element 32 to output detection element temperature information $T_t$ by detecting a temperature of an X-ray detection element 32, and a control unit 40 and 70 configured to calculate an output value for controlling the cooling means 60 to output the output value to the cooling means 60 so that the detection element temperature information $T_t$ becomes a preset temperature $T_S$. The control unit 40 and 70 is configured to detect a vacuum state of the vacuum insulation container 33 based on the output value.

5 Claims, 4 Drawing Sheets

X-RAY DETECTOR MONITORING DEVICE

TECHNICAL FIELD

The present invention relates to an X-ray detector monitoring device capable of detecting a replacement time of an X-ray detector, and more particularly to an X-ray fluorescence analyzer for calculating concentrations of elements contained in a sample.

BACKGROUND OF THE INVENTION

FIG. 3 is a schematic configuration diagram showing a configuration of a conventional typical energy dispersion type X-ray fluorescence analyzer.

The energy dispersion type X-ray fluorescence analyzer 201 is provided with an analysis chamber 20 in which a sample S is arranged, a device housing 50 in which an X-ray tube 10 and an X-ray detector unit 30 are arranged, a control board (control unit) 240 for controlling the X-ray detector unit 30 and a Peltier element 60, and a computer (control unit) 270 (see, e.g., Patent Document 1 and Patent Document 2).

The analysis chamber 20 is provided with a quadrilateral cylindrical upper chamber 21 having a quadrilateral plate-shaped upper surface, a lower chamber 22 having a V-shaped housing, and a quadrilateral plate-shaped sample base 23, and a circular opening is formed in a central portion of the sample base 23. Further, the upper chamber 21 is rotatably attached to the sample base 23 so that the lower surface of one side wall of the upper chamber 21 and one side of the upper surface side of the sample base 23 serve as an axis. On the other hand, the lower chamber 22 is provided on the lower surface side so as to close the opening of the sample base 23. The inside of the upper chamber 21 and the lower chamber 22 is connected to a vacuum pump (not shown) so that the inside can be evacuated into a high vacuum.

According to such an analysis chamber 20, by opening the upper chamber 21, the analyzing surface of a sample S can be arranged so as to close the opening of the sample base 23, and after the sample S is arranged, by closing the upper chamber 21, the inside of the upper chamber 21 and the lower chamber 22 can be evacuated to a high vacuum.

The device housing 50 has a quadrangular cylindrical shape having a quadrangular plate-like lower surface, and a peripheral edge portion of the lower surface side of the sample base 23 is attached to the upper surface of a side wall of the quadrangular cylindrical shape.

The X-ray tube 10 has a laterally oriented cylindrical housing in which a target (not shown) serving as an anode and a filament (not shown) serving as a cathode are arranged. As a result, when a high voltage is applied to the target and a low voltage is applied to the filament to cause the thermal electrons emitted from the filament to collide with the end surface of the target, primary X-rays generated at the end surface of the target is emitted. Such an X-ray tube 10 is fixedly attached to the left side surface of the lower chamber 22 and is configured such that the primary X-rays emitted from the X-ray tube 10 enter the circular opening of the sample base 23.

Therefore, the analysis surface of the sample S is arranged so as to close the opening of the sample base 23, so that the analysis surface of the sample S is irradiated with the primary X-rays.

The control board 240 includes a temperature control means 240a and an integrator 40b. When the measurement is started, the temperature control means 240a performs control to receive a detection element temperature information $T_t$ at a predetermined time interval $\Delta t$ from a resistance thermometer 81 in the X-ray detector unit 30, which will be described later, calculate a current value $I_t$ so that the temperature of the X-ray detection element 32 becomes a preset temperature $T_S$, and output the current value $I_t$ to the Peltier element 60.

The computer 270 is provided with a CPU 271, a memory 272, and a display device 73, and the CPU 271 has a measuring means 71a for obtaining the intensity $X_n$ of the fluorescent X-rays from the X-ray detection element 32.

The X-ray detector unit 30 has a substantially conical-shaped vacuum insulation container 33 in which an X-ray introduction window 31, such as, e.g., a beryllium film, is formed on its upper surface, and the X-ray detection element (semiconductor element) 32 for detecting the intensity of the fluorescent X-rays is arranged inside the vacuum insulation container 33. Such an X-ray detector unit 30 is designed to be attached to a mounting portion 50a in the device housing 50 on the right side of the lower chamber 22, and is configured so that the fluorescence X-rays generated on the analytical surface of the sample S enter the X-ray introduction window 31.

Therefore, when the analysis surface of the sample S is irradiated with the primary X-rays, fluorescence X-rays are generated on the analysis surface of the sample S, and the X-ray detection element 32 detects the fluorescent X-ray intensity (electric signal).

Incidentally, the X-ray detection element 32 needs to be cooled to a very low temperature (preset temperature Ts) in order to suppress mixing of thermal noise to the electric signal. For this reason, the Peltier element (cooling means) 60 and the resistance thermometer (detection element temperature sensor) 81 are arranged inside the vacuum insulation container 33.

The resistance thermometer 81 detects the temperature of the X-ray detection element 32 and outputs the detection element temperature information $T_t$ to the temperature control means 240a at a predetermined time interval $\Delta t$. A Peltier current of an arbitrary current value (output value) $I_t$ is caused to flow through the Peltier element 60 by the temperature control means 240a, resulting in a very low temperature of the Peltier element. With this, the X-ray detection element 32 is cooled to a preset temperature $T_S$.

Further, the X-ray detector unit 30 has a lifetime. Therefore, the user turns on the X-ray detector unit 30 and simultaneously operates the integrator 40b as an operating time monitor of the X-ray detector unit 30 to continuously accumulate the operating time until it is turned off. With this, it is determined whether or not the operating time has reached the lifetime based on the value indicated by the integrator 40b. Note that the lifetime of the X-ray detector unit 30 is guaranteed by the manufacturer in the form of a guaranteed time, and the user prepares an X-ray detector unit 30 for a replacement when the value of the integrator 40b has reached the guaranteed time. Thus, the value of the integrator 40b serves an indication to know the replacement time of the X-ray detector unit 30.

PRIOR ART DOCUMENT

Patent Document

Patent Document 1: Japanese Unexamined Patent Application Publication No. 5-159733

Patent Document 2: Japanese Unexamined Patent Application Publication No. 2006-242663

SUMMARY OF THE INVENTION

Problems to be Solved by the Invention

On the other hand, in the energy dispersion type X-ray fluorescence analyzer 201 as described above, when apertures are formed in the beryllium film serving as the X-ray introduction window 31 due to erosion, etc., of beryllium by water, air enters the vacuum insulation container 33 and the vacuum insulation is deteriorated, that is, so-called "slow leak" occurs. When the apertures are widened due to the slow leak, a warning message "Detector Temperature Error" indicating that it will not become a preset temperature $T_S$ is displayed, and a replacement, etc., of the X-ray detector unit 30 may be sometimes required.

However, since the timing at which the X-ray detector unit 30 becomes unusable due to the slow leak is not correlated with the operating time of the X-ray detector unit 30, there is a problem that the user cannot grasp the replacement time of the X-ray detector unit 30 and therefore the device becomes suddenly unusable.

Means for Solving the Problem

The present inventor has investigated how to detect when an X-ray detector unit 30 becomes unusable due to the slow leakage. When a slow leak occurs in the X-ray detector unit 30, the cooling capacity required to maintain the preset temperature $T_S$ gradually increases, so the present inventor recorded the change in the cooling capacity of the X-ray detector unit 30 and found to issue a warning message by predicting the time at which the cooling capacity exceeded the upper limit.

That is, the X-ray detector monitoring device according to the present invention includes:

an X-ray detector provided with an X-ray detection element for detecting X-ray intensity and a vacuum insulation container in which an X-ray introduction window is formed;

a cooling means configured to cool the X-ray detection element;

a detection element temperature sensor attached to the X-ray detection element to output detection element temperature information by detecting a temperature of the X-ray detection element; and a control unit configured to calculate an output value for controlling the cooling means to output the output value to the cooling means so that the detection element temperature information becomes a preset temperature, wherein the control unit detects a vacuum state of the vacuum insulation container based on the output value.

Here, the "preset temperature" denotes an arbitrary temperature determined by a designer, a user, or the like, and is a temperature for suppressing mixing of thermal noise to the electric signal detected by the X-ray detection element.

Effects of the Invention

As described above, according to the X-ray detector monitoring device of the present invention, the user of the device can recognize the replacement time due to the slow leak of the X-ray detector which cannot be dealt with by the notification of the replacement time by the mere conventional integration of the operating time.

(Means and Effects for Solving Other Problems)

Further, in the aforementioned invention, the device may further include a storage unit configured to store an output value threshold value for determining that a vacuum state is abnormal and store the output value output to the cooling means, and the control unit may include a replacement time prediction means for notifying a replacement time of the X-ray detector based on a temporal change of the output value and the output value threshold value.

Further, in the aforementioned invention, the device may further include a detector ambient temperature sensor arranged outside the X-ray detector to detect an ambient temperature of the X-ray detector to output ambient temperature information, the control unit may detect a vacuum state of the vacuum insulation container based on the output value and the detector ambient temperature information.

Further, in the aforementioned invention, the cooling means may be a Peltier element or a combination of liquid nitrogen and a heater.

Further, in the aforementioned invention, the output value may be a voltage value and/or a current value output to the Peltier element or the heater.

EMBODIMENTS FOR CARRYING OUT THE INVENTION

Hereinafter, embodiments of the present invention will be described with reference to the attached drawings. It should be noted that the present invention is not limited to the embodiments described below, and various embodiments are included within a range not departing from the spirit of the present invention.

First Embodiment

Figure 1:
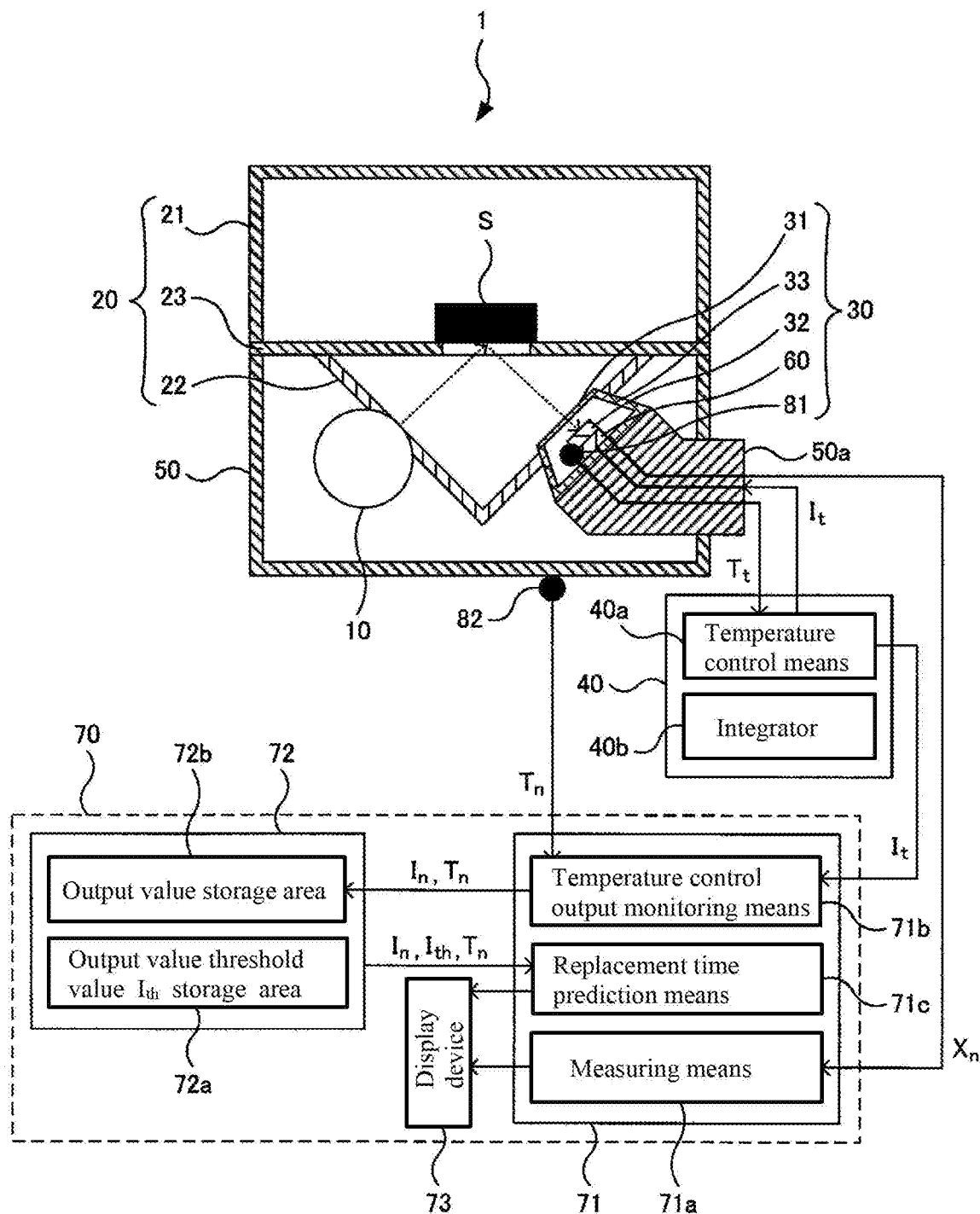
FIG. 1 is a schematic configuration diagram showing an example of an energy dispersion type X-ray fluorescence analyzer according to the present invention.

FIG. 1 is a schematic configuration diagram showing an example of an energy dispersion type X-ray fluorescence analyzer according to an embodiment of the present invention. The same configuration as that of the energy dispersion type X-ray fluorescence analyzer 201 described above will be allotted by the same reference symbol.

The energy dispersion type X-ray fluorescence analyzer 1 is provided with an analysis chamber 20 in which a sample S is arranged, a device housing 50 in which an X-ray tube 10 and an X-ray detector unit 30 are arranged, a resistance thermometer (detector ambient temperature sensor) 82, and a control board (control unit) 40 and a computer (control unit) 70 for controlling the X-ray detector unit 30 and the Peltier element 60.

The resistance thermometer 82 is attached to, for example, the outer surface of the device housing 50, and detects the ambient temperature of the X-ray detector unit 30 and outputs the detector ambient temperature information $T_n$ to a temperature control output monitoring means 71b of the computer 70, which will be described later.

The control board 40 has a temperature control means 40a and an integrator 40b. When the measurement is started, the temperature control means 40a performs control to receive the detection element temperature information $T_t$ from the resistance thermometer 81 in the X-ray detector unit 30 at a predetermined time interval $\Delta t$, calculate a current value $I_t$ so that the temperature of the X-ray detection element 32 becomes the preset temperature $T_S$, and output the current value $I_t$ to the Peltier element 60 and the temperature control output monitoring means 71b of the computer 70.

The computer 70 is provided with a CPU 71, a memory 72, and a display device 73. The functions processed by the computer 70 will be described in blocks. The computer 70 includes a measuring means 71a for acquiring the fluorescent X-ray intensity $X_n$ from the X-ray detection element 32, a temperature control output monitoring means 71b for storing the detector ambient temperature information $T_n$ and the current value $I_n$ acquired from the resistance thermometer 82 and the temperature control means 40a in an output value storage area 72b of the memory 72, and a replacement time prediction means 71c for notifying the replacement time of the X-ray detector unit 30 based on the current value $I_n$, an output value threshold value $I_{th}$, and the detector ambient temperature information $T_n$ acquired from the memory 72.

The memory 72 has an output value threshold value storage area 72a for storing an output value threshold value $I_{th}$ for predictively determining that the vacuum state is abnormal beforehand and an output value storage area 72b for storing the current value $I_n$ output to the Peltier element 60.

The temperature control output monitoring means 71b performs control to receive the detector ambient temperature information $T_n$ and the current value $I_n$ and store them in the output value storage area 72b. For example, at the time of measuring the $n^{th}$ sample $S_n$, the temperature control output monitoring means 71b receives the current value $I_t$ output so that the temperature of the X-ray detection element 32 becomes the preset temperature $T_S$ and stores the average value of the current value $I_t$ in the output value storage area 72b together with the detector ambient temperature information $T_n$ at the time of measuring the $n^{th}$ sample $S_n$ as the current value $I_n$ at the time of measuring the $n^{th}$ sample $S_n$.

Figure 4:
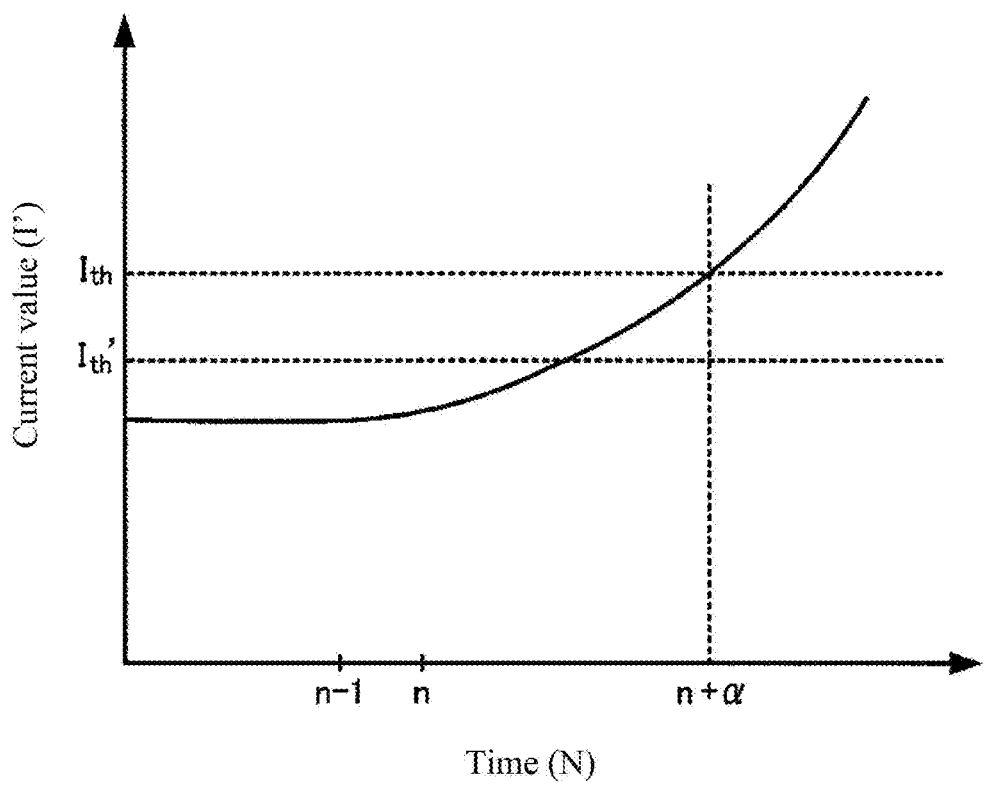
FIG. 4 is a graph showing an example of a temporal change of a current value.

The replacement time prediction means 71c performs control to notify the replacement time of the X-ray detector unit 30 based on the current value $I_n$, the output value threshold value $I_{th}$, and the detector ambient temperature information $T_n$. For example, the current value $I_n$ output at the time of the detector ambient temperature information $T_n$ at the time of measuring the $n^{th}$ sample $S_n$ is corrected to the current value $I_n'$ which would have been output when the detector ambient temperature information Tn was the predetermined temperature T. Then, the temporal change I(n)' of the current value as shown in FIG. 4 is created. With this, the time (n+α) when the current value $I_n'$ exceeds the output value threshold value $I_{th}$ is predicted. As a result, a warning message "Cooling capacity exceeds the upper limit by measuring samples by a more times" is displayed on the display device 73.

As described above, according to the first embodiment of the present invention, the user of the device can recognize the replacement time of the X-ray detector unit 30 due to the slow leak which could not have been dealt with the notification of the exchange timing by the mere conventional integration of the operating time.

Second Embodiment

Figure 2:
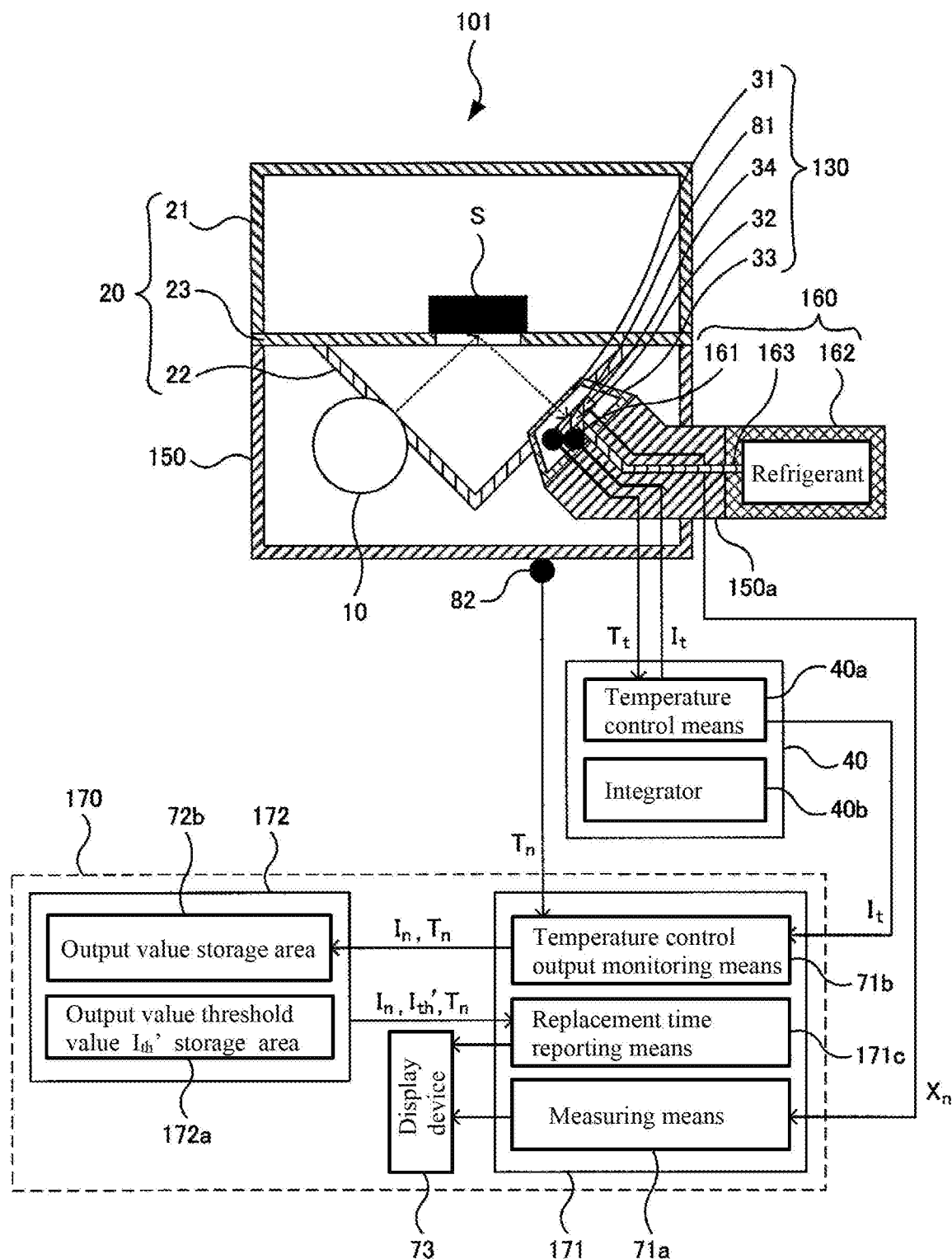
FIG. 2 is a schematic configuration diagram showing another example of an energy dispersion type X-ray fluorescence analyzer according to the present invention.
Figure 3:
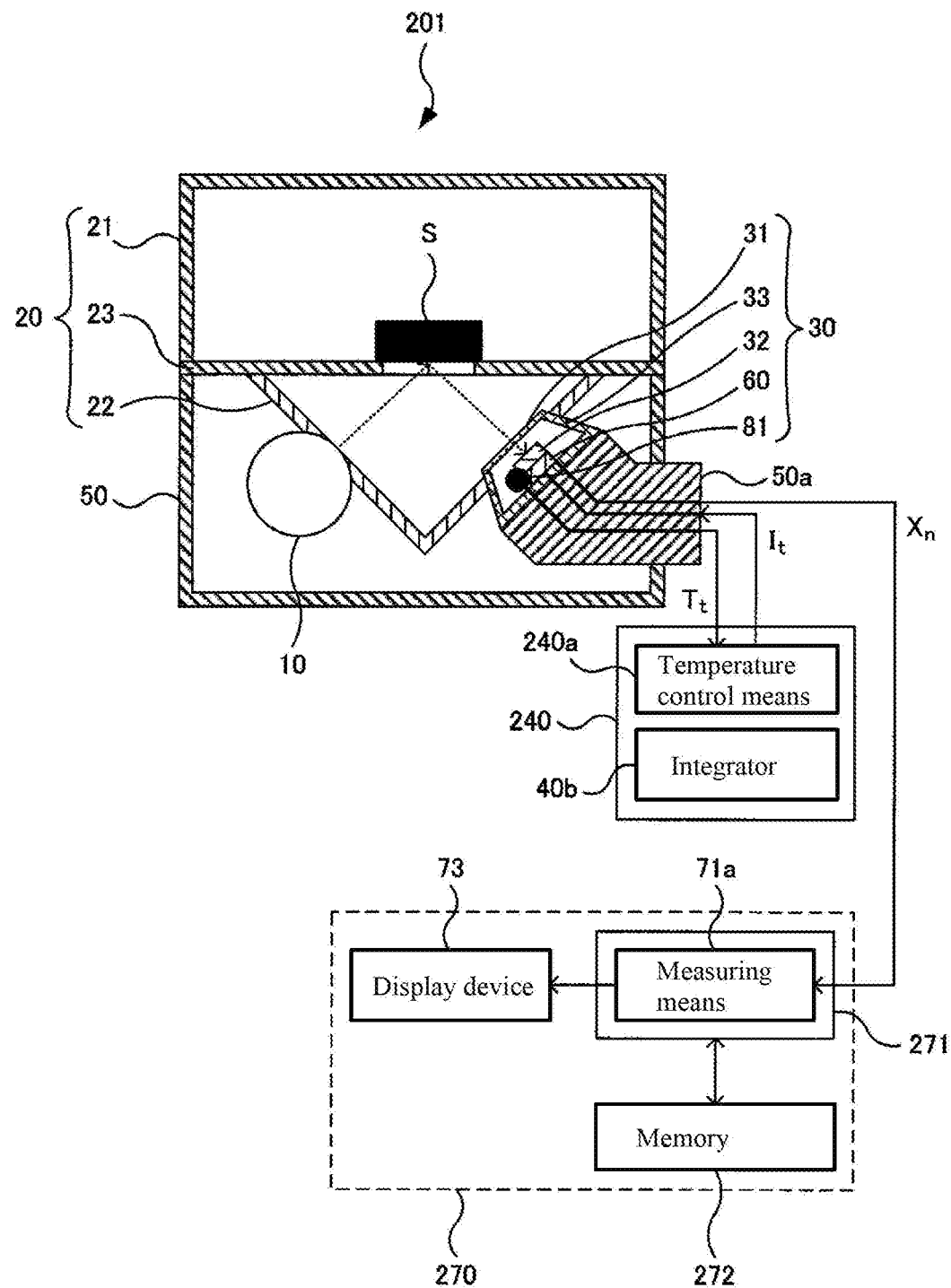
FIG. 3 is a schematic configuration diagram showing a conventional energy dispersion type X-ray fluorescence analyzer.

FIG. 2 is a schematic configuration diagram showing another example of an energy dispersion type X-ray fluorescence analyzer according to an embodiment of the present invention. Note that the same configuration as that of the energy dispersion type X-ray fluorescence analyzer 1 and 201 described above will be allotted by the same reference symbol.

The energy dispersion type X-ray fluorescence analyzer 101 is provided with an analysis chamber 20 in which a sample S is arranged, a device housing 150 in which the X-ray tube 10 and the X-ray detector unit 130 are arranged, a cooling means 160, a resistance thermometer (detector ambient temperature sensor) 82, a control board (control unit) 40 for controlling the X-ray detector unit 130 and the cooling means 160, and a computer (control unit) 170.

The cooling means 160 is provided with a refrigerant container 162 accommodating a refrigerant (e.g., liquid nitrogen), a heater 161, and a copper-made heat transfer member 163.

One end of the heat transfer member 163 is connected to the X-ray detection element 32 of the X-ray detector unit 130, and the other end thereof is connected to the refrigerant container 162. As a result, the other end portion of the heat transfer member 163 is cooled to a very low temperature by the refrigerant in the refrigerant container 162, and this cold heat is transmitted to the X-ray detection element 32 through the heat transfer member 163, whereby the X-ray detection element 32 is cooled to a very low temperature.

The heater 161 is heated by passing a heater current of an arbitrary current value (output value) $I_t$ from the temperature control means 40a of the control board 40. As a result, the temperature of the FET (an amplifier circuit for amplifying an electric signal corresponding to the energies of the fluorescent X-rays from the X-ray detection element 32) 34 excessively cooled by the refrigerant is adjusted to the preset temperature $T_S$.

The control board 40 has a temperature control means 40a and an integrator 40b. When the measurement is started, the temperature control means 40a performs control to receive detection element temperature information $T_t$ from the resistance thermometer 81 at a predetermined time interval $\Delta t$, calculate the current value $I_t$ so that the temperature of the FET 34 becomes the preset temperature $T_S$, and output the calculated current value $I_t$ to the heater 161 and the temperature control output monitoring means 71b of the computer 170.

The computer 170 is provided with a CPU 171, a memory 172, and a display device 73. The function processed by the computer 170 is explained in blocks. The computer includes a measuring means 71a for acquiring the fluorescent X-ray intensity $X_n$ from the X-ray detection element 32 through the FET 34, a temperature control output monitoring means 71b for acquiring the detector ambient temperature information $T_n$ from the resistance thermometer 82 and storing the detector ambient temperature information $T_n$ and the current value $I_n$ in the output value storage area 72b, and a replacement time reporting means 171c for notifying the replacement time of the mounting portion 150a to which the X-ray detector unit 130 and the control board 40 are attached based on the current value $I_n$, the output value threshold value $I_{th}'$, and the detector ambient temperature information $T_n$ acquired from the memory 172.

The memory 172 has an output value threshold value storage area 172a for storing an output value threshold value $I_{th}'$ for reporting that the vacuum state is abnormal and an output value storage area 72b for storing the current value $I_n$ output to the heater 161 of the cooling means 160.

The replacement time reporting means 171c controls to notify the replacement time of the mounting portion 150a to which the X-ray detector unit 130 and the control board 40 are attached based on the current value $I_n$, the output value threshold value $I_{th}'$, and the detector ambient temperature information $T_n$. For example, the current value $I_n$ output at the time of the detector ambient temperature information $T_n$ at the time of measuring the $n^{th}$ sample $S_n$ is corrected to the current value $I_n'$ which would have been output when the detector ambient temperature information $T_n$ was the predetermined temperature T. With this, when the current value $I_n'$ exceeds the output value threshold value $I_{th}'$, a warning message "Cooling capacity exceeds the upper limit value" is displayed on the display device 73.

As described above, according to the second embodiment of the present invention, the user of the device can recognize the replacement time of the mounting portion 150a to which the X-ray detector unit 130 and the control board 40 are attached due to the slow leak, which could not be dealt with by the notification of the replacement time by the mere conventional integration of the operating time.

INDUSTRIAL APPLICABILITY

The present invention can be used for an X-ray fluorescence analyzer, etc., for calculating concentrations of elements contained in a sample.

DESCRIPTION OF SYMBOLS

1: X-ray fluorescence analyzer
10: X-ray tube
20: analysis chamber
30: X-ray detector unit (X-ray detector)
31: X-ray introduction window
32: X-ray detection element
33: vacuum insulation container
40: control board (control unit)
60; Peltier element (cooling means)
70; computer (control unit)
81: resistance thermometer (detection element temperature sensor)

The invention claimed is:

1. An X-ray detector monitoring device comprising:
   an X-ray detector provided with an X-ray detection element for detecting X-ray intensity and a vacuum insulation container in which an X-ray introduction window is formed;
   a cooling means configured to cool the X-ray detection element;
   a detection element temperature sensor attached to the X-ray detection element to output detection element temperature information by detecting a temperature of the X-ray detection element; and
   a control unit configured to calculate an output value for controlling the cooling means to output the output value to the cooling means so that the detection element temperature information becomes a preset temperature,
   wherein the control unit detects a vacuum state of the vacuum insulation container based on the output value.

2. The X-ray detector monitoring device as recited in claim 1, further comprising:
   a storage unit configured to store an output value threshold value for determining that a vacuum state is abnormal and store the output value output to the cooling means,
   wherein the control unit includes a replacement time prediction means for notifying a replacement time of the X-ray detector based on a temporal change of the output value and the output value threshold value.

3. The X-ray detector monitoring device as recited in claim 1, further comprising:
   a detector ambient temperature sensor arranged outside the X-ray detector to detect an ambient temperature of the X-ray detector to output detection unit ambient temperature information,
   wherein the control unit detects the vacuum state of the vacuum insulation container based on the output value and the detector ambient temperature information.

4. The X-ray detector monitoring device as recited in claim 1,
   wherein the cooling means is a Peltier element or a combination of liquid nitrogen and a heater.

5. The X-ray detector monitoring device as recited in claim 4,
   wherein the output value is a voltage value and/or a current value output to the Peltier element or the heater.

* * * * *